(12) United States Patent
Joch et al.

(10) Patent No.: US 6,291,954 B1
(45) Date of Patent: Sep. 18, 2001

(54) METHOD AND CIRCUIT ARRANGEMENT FOR MONITORING THE OPERATING STATE OF A LOAD

(75) Inventors: Christoph Joch, Schwalbach; Matthias Hadamik, Bad Homburg, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/464,608

(22) Filed: Dec. 15, 1999

(30) Foreign Application Priority Data

Dec. 18, 1998 (DE) .............................. 198 58 697

(51) Int. Cl.$^7$ ...................................... H02P 7/00
(52) U.S. Cl. ............................... 318/434; 318/801
(58) Field of Search .................................. 318/138, 434, 318/799, 800, 801, 802

(56) References Cited

U.S. PATENT DOCUMENTS

| | | | |
|---|---|---|---|
| 4,757,241 | * 7/1988 | Young | 318/254 |
| 4,841,207 | * 6/1989 | Cheyne | 388/811 |
| 5,038,092 | * 8/1991 | Asano et al. | 318/811 |
| 5,550,445 | * 8/1996 | Nii | 318/153 |
| 5,646,499 | * 7/1997 | Doyama et al. | 318/801 |
| 5,677,611 | * 10/1997 | Yoshihara et al. | 318/803 |
| 5,764,024 | * 6/1998 | Wilson | 318/805 |
| 5,808,428 | * 9/1998 | Ito et al. | 318/139 |
| 5,912,539 | * 6/1999 | Sugitani et al. | 318/434 |
| 5,923,135 | * 7/1999 | Takeda | 318/432 |

* cited by examiner

Primary Examiner—Robert E. Nappi
Assistant Examiner—Rina I. Duda
(74) Attorney, Agent, or Firm—Martin A. Farber

(57) ABSTRACT

A invention relates to a method for monitoring the operating state of a load which is driven cyclically by a control signal, especially for an electric motor in a motor vehicle, the cyclic drive being provided by a pulse-width-modulated drive signal. In a method which permits the detection of the operating state of the load as well as driving the load in accordance with the situation on the basis of the operating state, the drive signal, whose pulse width is varied in order to limit the current flow through the load, is evaluated in order to determine the operating state of the load.

10 Claims, 3 Drawing Sheets

METHOD AND CIRCUIT ARRANGEMENT FOR MONITORING THE OPERATING STATE OF A LOAD

FIELD AND BACKGROUND OF THE INVENTION

The invention relates to a method for monitoring the operating state of a load which is driven cyclically by a control signal, especially for an electric motor in a motor vehicle, the cyclic drive being provided by a pulse-width-modulated drive signal, and to a circuit arrangement for implementing the method.

During the dynamic operation of loads, such as an electric motor in a control loop, the load is driven with pulse-width-modulated signals. During this dynamic operation it is necessary to accelerate the electric motor, to brake it or else to change the direction of rotation.

In the event of an abrupt change of direction on the electric motor, a reversing current is produced which, for a short time, may be several times the operating current of the electric motor. In order to prevent overloading of the power source and the electronics for this case, it is usual to provide electronic current limiters.

In order to protect the electronics from a short circuit, electric short-circuit protection is provided, whose threshold must lie above the high reversing current.

However, because of the real internal resistances of the electronics, at low operating voltages and in the case of a non-ideal short circuit ($R_1 > 30$ m$\Omega$) or a stalled motor, a current flow which leads to the short-circuit protection responding is not reached. In this case because of the finite current rise, the current limiter responds only with a delay. Since the current limiter is reset again during each PWM period, a high, pulsed current flows through the output stage over the whole time, which leads to the electronics being destroyed or produces the risk of a cable fire.

SUMMARY OF THE INVENTION

The invention is thus based on the object of providing a method and a circuit arrangement which permit the detection of the operating state of the load as well as driving the load in accordance with the situation on the basis of the operating state.

According to the invention, the object is achieved by the drive signal, whose pulse duration is varied in order to limit the current flow through the load, being evaluated in order to determine the operating state of the load.

The advantage of the invention is that no additional monitoring devices are needed, but a signal generated for another purpose is evaluated.

In a development, the frequency of response of the current limiter with in a predefined time period is counted.

A conclusion about the operating state of the load is drawn from the frequency of the current limitation.

As a result of the evaluation of the signal, there is the possibility of reacting to the fault. By changing the original PWM signal, the dynamics of the motor control system, and hence the loading on the output stages, can be reduced. At the same time, changes in the operating voltage and in the temperature are corrected by such a dynamic control system.

In order to detect the response of the current limiter, the pulse duration of the varied drive signal is evaluated. By means of a desired/actual value comparison of the pulse duration, the effectiveness of the current limitation is established.

In order to limit the current flow through the load, a current flowing through the load is advantageously measured and, while a control pulse of the drive signal is present on the load, the measured current is compared with a limiting value, the pulse duration of the control signal being varied on the basis of this comparison.

The advantage is that, using the current flowing through the load, the operating state of the inductive load can be determined reliably, and that, on the basis of the current, the pulse duration and therefore the current present on the output stage can be set in such a way that critical situations are reliably prevented.

Current limitation is advantageously achieved if the pulse duration is varied when the limiting value is reached.

A further configuration of the invention relates to a circuit arrangement for driving a load cyclically, especially an electric motor in a motor vehicle, in which, in order to implement the method according to the invention, the load can be driven, via an output stage, with a pulse-width-modulated drive signal generated by a control device. This circuit arrangement is defined in that the current flowing through the load is determined by a current-measuring device, which is connected to a threshold device which, when the threshold value is reached, drives a switching device which terminates the control pulse while there is a control signal present on the output stage, it being possible for the control pulse from the threshold device to be fed to an evaluation device in order to determine the operating state of the load.

By terminating the control pulse on the output stage, the current flow through the inductive load is limited. The evaluation device observes the response of the current-limiting circuit over a number of PWM periods within a predefined time duration. Since the behavior of the load under various operating conditions has been determined in preceding measurements, the frequency of response of the current-limiting circuit is known for each of these operating states. The comparison of the frequency actually registered with the frequency corresponding to the normal state permits conclusions about the operating state of the load.

The evaluation of the drive signal does not always have to be carried out in hardware, but is also readily possible using suitable software.

In order to evaluate the output signal from the threshold device, this signal is fed to an integration element or to the control device which generates the original pulse-width-modulated drive signal. Using the response frequency detected over a number of periods of the pulse-width-modulated signal, the loading situation of the motor is assessed and necessary countermeasures are initiated.

The switching device advantageously contains a flip-flop, whose set input leads to the threshold device, while the pulse-width-modulated signal generated by the control device is present on its reset input. Using such a simple circuit arrangement, not only is digital current limitation provided by evaluating the output signal from the flip-flop, but at the same time a dynamic control loop for driving the inductive load is established.

In this case, the load to be switched is a constituent part of a bridge circuit, each half bridge of this bridge circuit being driven by the varied pulse-width-modulated signal.

However, depending on the application, the load can be a constituent part of a half bridge or can be driven by the controller via only one switch.

BRIEF DESCRIPTION OF THE DRAWINGS

The invention permits numerous embodiments. One of these is to be described in more detail using the figures illustrated in the drawings, in which.

Identical features are identified by identical reference symbols.

DETAILED DESCRIPTION OF THE PREFERRED EMBODIMENT

Figure 1:
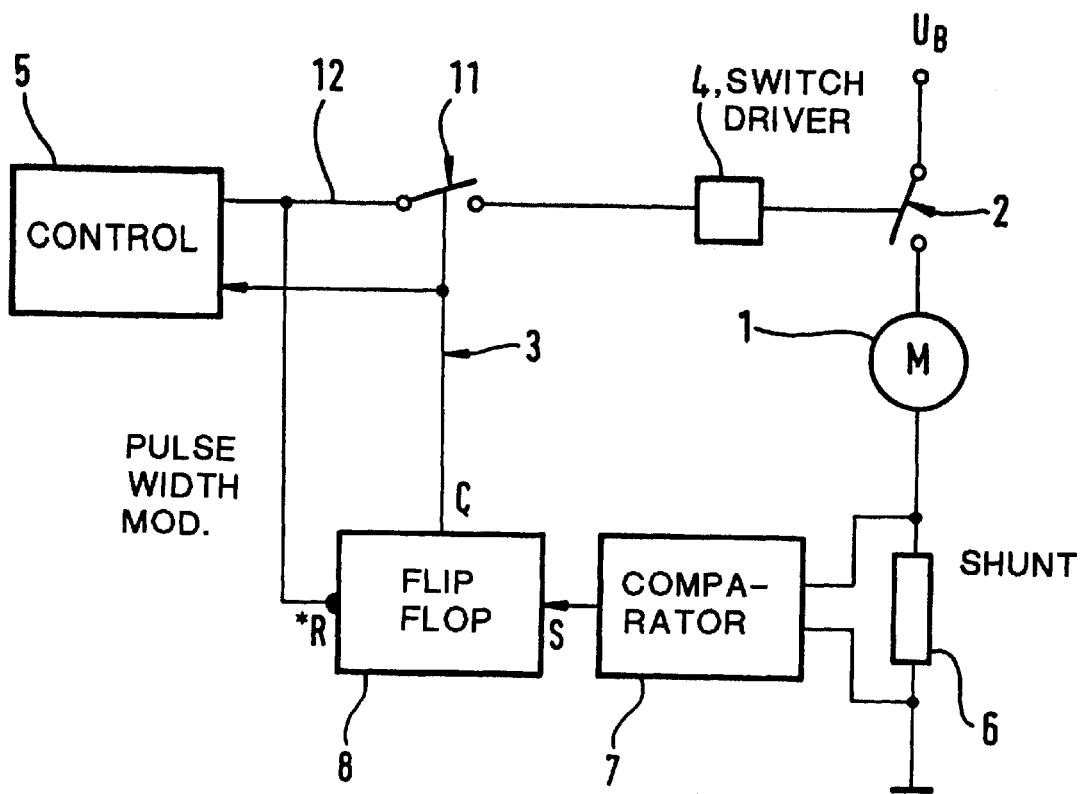
FIG. 1 shows a first embodiment of the drive circuit according to the invention.

In FIG. 1, an electric motor 1 is connected between the battery voltage $U_B$ and ground. A switch 2 is driven cyclically by a driver 4 on the basis of a pulse-width-modulated signal generated by a control device 5, by which means the electric motor 1 is connected to the battery voltage $U_B$ at a predefined frequency. A shunt 6 is connected between the electric motor 1 and ground. The voltage across the shunt (current measuring resistor) 6 is picked off by a threshold switch (comparator) 7, whose output drives the set input of a flip-flop 8. The reset input of the flip-flop 8 leads to the control device 5. The pulse-width-modulated drive voltage generated by the control device 5 is present on the reset input of the flip-flop 8. The output of the flip-flop 8 actuates a switch 11, which is connected to the connecting line 12 between control device 5 and switch 2. Furthermore, there is a connection 3 between the flip-flop 8 and the control device 5.

Figure 2:
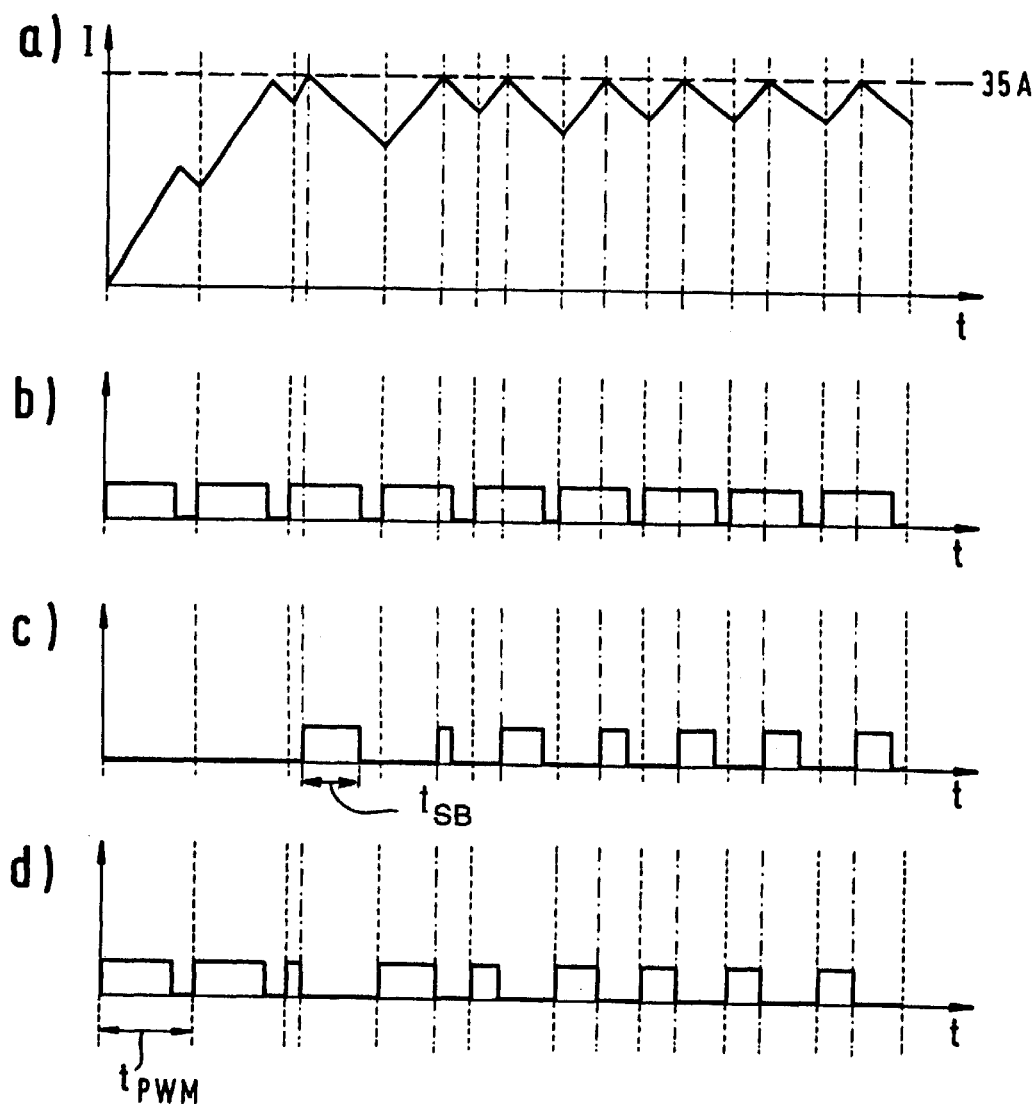
FIG. 2 shows a pulse diagram.

The functioning of this circuit arrangement is to be explained with reference to the pulse diagrams in FIG. 2. Diagram a shows the current I flowing in the motor 1 over the time t, as is measured by the shunt 6. The time axis is subdivided into time sections $t_{PWM}$, which correspond to the period duration of the pulse-width-modulated signal generated by the control device 5.

FIG. 2b shows the PWM signal output by the control device 5 to the switch 2. Here, it can be seen that this signal has a constant mark/space ratio. When the electronics are switched on, such a signal drives the motor 1. When a pulse is present, the switch 2 closes, as a result of which the motor 1 is connected to the operating voltage $U_B$, and a current flows through the shunt 6. In the pulse space, the current drops and rises again only after the start of the application of a new pulse by means of the pulse-width-modulated signal generated by the controller 5.

The voltage drop corresponding to this current flow through the shunt 6 is measured by the comparator 7 and amplified. In the comparator 7, it is determined whether the current flowing through the motor has reached a threshold of 35 ampere (cf. FIG. 2a). If this is the case, the set input of the flip-flop 8 is set. At the same instant, there is present on the reset input of the flip-flop 8 an item of information relating to whether a pulse or a space of the pulse-width-modulated signal is present on the switch 2. If a pulse is present, the flip-flop 8 switches the switch 11, which results in a pulse $t_{SB}$ (illustrated in FIG. 2c) being generated, which limits the time duration of the original drive signal. The pulse-width-modulated drive signal resulting from this is illustrated in FIG. 2d, from which it can be seen that the pulse $t_{SB}$ set by the flip-flop 8 during one period shortens the original pulse-width-modulated signal, by which means the current rise through the motor 1 is limited.

The measuring and control operation just described is repeated in each period of the drive signal. As can be seen from FIG. 2, because of the concrete operating conditions, a pulse-width-modulated signal is generated in which different pulse durations occur within the individual periods.

How often the current limiter responds in this case depends on the operating conditions of the motor 1.

The pulse-width-modulated signal varied in this way is fed to the controller 5 for evaluation. Information relating to the percentage to which the current-limiting device responds at different loading states of the motor 1 is stored in the form of a table in a memory device (not further illustrated) of the controller 5. This percentage behavior is determined from the frequency of the current limitation by means of which the control pulse generated by the controller 5 is reduced.

This means, for example, that it is assumed that the current-limiting device responds by up to 50% in the normal case during a defined measuring time of 0.5 s. That is to say, the current is limited in 50% of the PWM periods during a measuring time of 0.5 s. If the drive signal has a frequency fpw of 10 kHz, for example, then 5000 periods will be generated in 0.5 s. Given a response frequency of 50%, the current limiter responds during 2500 periods.

If the evaluation of the varied pulse-width-modulated signal results in the current-limiting circuit responding greater than 50%, it is concluded there is a stiff mechanism. The evaluation device must react appropriately to this. In order to protect the output stage, the control gain is reduced, for example.

Stalling of the motor 1 is detected if the current limiter responds at 100%. In this case, the drive of the motor is stopped by the controller. By means of a signaling device, the attention of the operator is drawn to the fault, and the controller 5 can initiate further measures.

Figure 3:
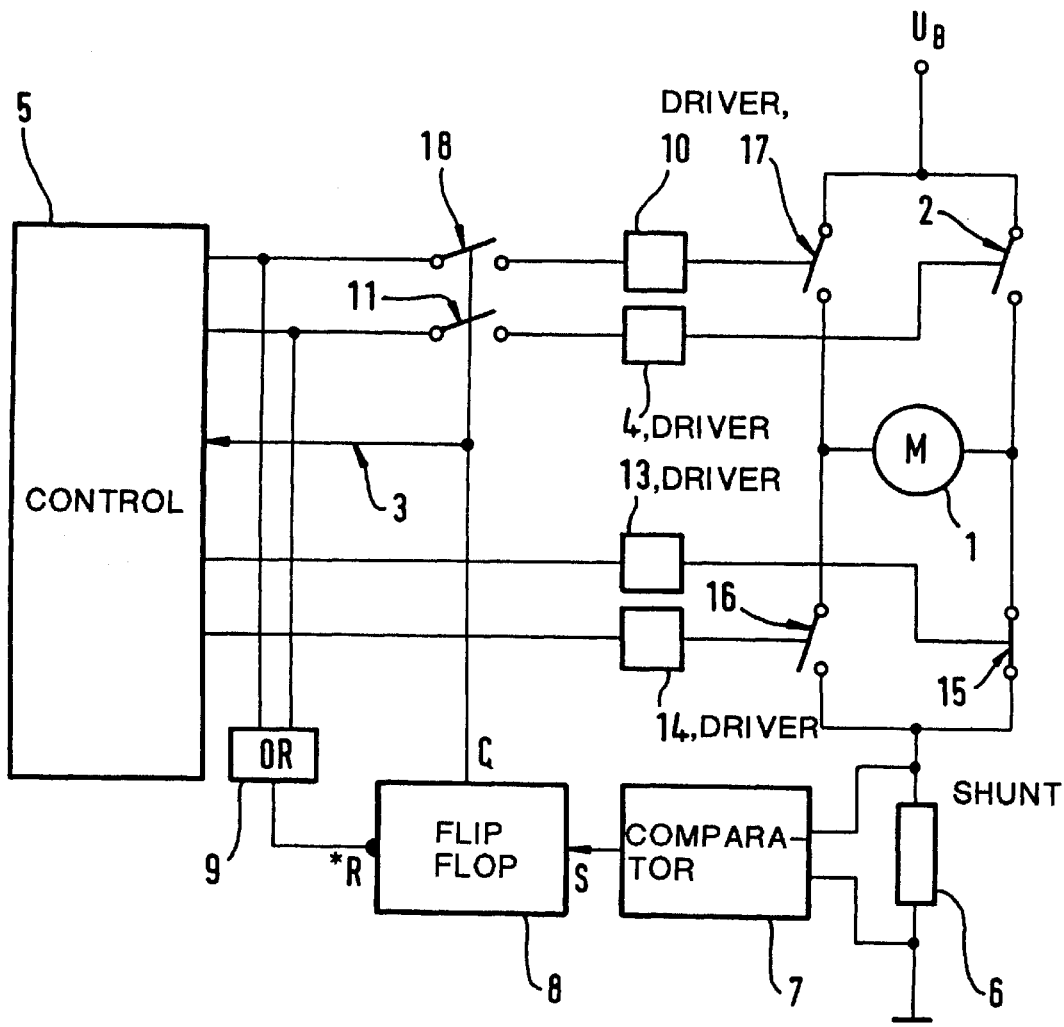
FIG. 3 shows a second embodiment of the drive circuit according to the invention.

FIG. 3 illustrates a circuit arrangement for driving an adjusting motor variably, for example one which adjusts the stroke of valves in motor vehicles. As can be seen from FIG. 3, the motor 1 is a constituent part of a bridge circuit consisting of the switches 2, 17 and 16, 15. Each half bridge 16, 17 and 2, 15 is connected between the operating voltage $U_B$ and ground. Here too, a current-measuring resistor 6 is arranged between the bridge and ground. Each switch is driven by a driver. In this case, the driver 4 switches the switch 2. The driver 10 drives the switch 17 cyclically, while the driver 14 controls the switch 16. The switch 15 is controlled by the driver 13. An OR circuit 9 is used to determine the output of the controller 5 on which the pulse-width-modulated signal is present, the OR circuit being connected to the reset input R of the flip-flop 8.

In order to simplify the explanation, only one half bridge will be considered, the switch 2 being at low, while the PWM signal is present on the second switch 17. The switch 16 is open and the switch 15 is continuously closed.

The motor 1 is regularly switched on and off by the control device 5 with high currents (for example between 10 and 100 ampere). In the initial situation, current is applied to the motor 1, in the present example the switch 17 is driven cyclically by the PWM signal, while the switch 15 is permanently closed. As already explained in connection with FIG. 1, the current flowing through the motor 1 is measured by means of the shunt 6 and evaluated in the threshold circuit 7. If a limiting value of 35 ampere is exceeded, and if a pulse is simultaneously present on the driver 10, the flip-flop 8 switches the switch 18, as a result of which the pulse-width-modulated drive voltage is varied in accordance with FIG. 2.

The varied pulse-width-modulated signal is fed, via the line 3, to the controller 5 for evaluation. The evaluation of the varied pulse duration of the drive signal is carried out simply, as already described, in the control device 5, which is a microcontroller.

We claim:

1. A method for monitoring operating state of a load which is driven cyclically by a control signal, especially for an electric motor in a motor vehicle, the control signal being provided via a switch operated by a pulse-width-modulated drive signal, comprising the step of evaluating the drive signal by use of a current limiter responsive to the magnitude of the control signal, a pulse width of the drive signal being varied in order to limit current flow through the load, there being a further step of terminating a pulse of the drive signal by the current limiter in order to determine the operating state of the load.

2. The method as claimed in claim 1, further comprising the step of counting occurrences of an output signal of the current limiter within a predefined time period for evaluating the operating state of the load.

3. The method as claimed in claim 2, wherein, in order to detect the response of the current limiter, evaluating pulse duration of the varied drive signal.

4. The method as claimed in claim 1, wherein, in order to limit the current flow through the load, measuring a current flowing through the load and, while a control pulse is present on the load, comparing the measured current with a limiting value, the pulse duration of the control signal being varied based on said comparing step.

5. The method as claimed in claim 4, further comprising the step of varying the pulse width when the limiting value is reached.

6. A circuit arrangement for driving a load cyclically, especially an electric motor in a motor vehicle, in which, in order to implement the method as claimed in claim 1, the load is drivable, via an output stage (4, 15, 16, 17), with a pulse-width-modulated signal generated by a control device, wherein the current flowing through the load (1) is determined by a current-measuring device (6), which is connected to a threshold device (7) which, when a threshold value is reached, drives a switching device (8) which terminates an output control pulse of the output stage while the output control pulse is present on the output stage, wherein it is possible for a threshold control pulse from the threshold device (7) to be fed to an evaluation circuit (5) in order to determine the operating state of the load (1), and wherein a feeding of the threshold control pulse to the evaluation circuit is determined by the switching device (8) based on the state of the pulse-width-modulated signal.

7. The circuit arrangement as claimed in claim 6, wherein an output signal from said threshold device (7) is fed to an integration element for evaluation.

8. The circuit arrangement as claimed in claim 6, wherein for evaluation, an output signal is fed to the control device (5) generating the pulse-width-modulated drive signal.

9. A circuit arrangement for driving a load cyclically, especially an electric motor in a motor vehicle, in which, in order to implement the method as claimed in claim 1, the load is drivable, via an output stage, with a pulse-width-modulated signal generated by a control device, wherein the current flowing through the load (1) is determined by a current-measuring device (6), which is connected to a threshold device (7) which, when a threshold value is reached, drives a switching device (8) which terminates a control pulse while there is a control pulse present on the output stage (4, 15, 16, 17), wherein it is possible for the control pulse from the threshold device (7) to be fed to an evaluation circuit (5) in order to determine the operating state of the load (1); and wherein the switching device (8) is a flip-flop whose set input (S) leads to the threshold device (7) and on whose reset input (R) the pulse-width-modulated drive signal generated by the control device (5) is present.

10. The circuit arrangement as claimed in claim 6, wherein the load (1) to be switched is a constituent part of a bridge circuit, each half bridge of this bridge circuit being capable of being driven by the varied pulse-width-modulated signal.

* * * * *